(12) United States Patent
Kawai et al.

(10) Patent No.: US 10,371,298 B2
(45) Date of Patent: Aug. 6, 2019

(54) EMERGENCY DETACHMENT DEVICE OF FLUID HANDLING DEVICE

(71) Applicants: TOKYO BOEKI ENGINEERING LTD, Tokyo (JP); KAWASAKI HEAVY INDUSTRIES, LTD, Kobe-shi, Hyogo (JP)

(72) Inventors: Tsutomu Kawai, Nagaoka (JP); Tomonori Takase, Akashi (JP); Shuntaro Unno, Akashi (JP)

(73) Assignees: TOKYO BOEKI ENGINEERING LTD., Chuo-ku, Tokyo (JP); KAWASAKI HEAVY INDUSTRIES, LTD., Chuo-ku, Kobe-shi (JP)

( * ) Notice: Subject to any disclaimer, the term of this patent is extended or adjusted under 35 U.S.C. 154(b) by 0 days.

(21) Appl. No.: 15/738,419

(22) PCT Filed: Jul. 7, 2016

(86) PCT No.: PCT/JP2016/070171
§ 371 (c)(1),
(2) Date: Dec. 20, 2017

(87) PCT Pub. No.: WO2017/010404
PCT Pub. Date: Jan. 19, 2017

(65) Prior Publication Data
US 2018/0224034 A1 Aug. 9, 2018

(30) Foreign Application Priority Data
Jul. 10, 2015 (JP) .................................. 2015-139092

(51) Int. Cl.
*F16L 37/32* (2006.01)
*F16L 29/04* (2006.01)
(Continued)

(52) U.S. Cl.
CPC ............ *F16L 29/04* (2013.01); *B67D 7/3218* (2013.01); *B67D 9/00* (2013.01); *F16L 37/30* (2013.01);
(Continued)

(58) Field of Classification Search
CPC ...... F16L 29/04; F16L 37/32; Y10T 137/8807
(Continued)

(56) References Cited

U.S. PATENT DOCUMENTS 4,483,359 A * 11/1984 Robertson ............... F16K 17/14
137/616
5,253,675 A * 10/1993 Ooshio et al. .......... F16L 29/04
137/614.05
(Continued)

FOREIGN PATENT DOCUMENTS

JP 2002-005378 A1 1/2002
JP 2003-113973 A 4/2003
(Continued)

OTHER PUBLICATIONS

International Search Report for PCT/JP2016/070171 filed Aug. 30, 2016.

*Primary Examiner* — Kevin L Lee
(74) *Attorney, Agent, or Firm* — Sughrue Mion, PLLC

(57) ABSTRACT

An object is to provide an emergency detachment device of a fluid handling device, the emergency detachment device having exceptional heat insulation performance and making it possible to handle extremely-low-temperature fluids such as liquid hydrogen. A first coupler 2 and a second coupler 3 are provided with a vacuum section 10 between an inner pipe section 5 and an outer pipe section 6, and are provided with two valves 1 in series. A remaining-fluid-transferring mechanism is provided such that, after second valves 1B provided further inward enter a closed-valve state during (Continued)

emergency detachment, residual fluid that remains closer to the first valves 1A than the second valves 1B is transferred into the inner pipes sections 5 provided further inward of the second valves 1B. Once emergency detachment is in a completed state, heat insulation sections 9 are formed in the space between the first valve 1A and the second valve 1B in each of the first coupler 2 and the second coupler 3, and heat insulation performance is improved by the heat insulation sections 9 and the vacuum sections 10.

6 Claims, 9 Drawing Sheets

(51) Int. Cl.
    *B67D 9/00*         (2010.01)
    *F16L 37/30*       (2006.01)
    *B67D 7/32*         (2010.01)

(52) U.S. Cl.
    CPC .......... *F16L 37/32* (2013.01); *Y10T 137/8807* (2015.04)

(58) Field of Classification Search
    USPC .................. 137/614.02–614.05, 615, 616, 7
    See application file for complete search history.

(56) References Cited

U.S. PATENT DOCUMENTS

| | | | |
|---|---|---|---|
| 7,182,098 B2* | 2/2007 | Tilling .................... | F16L 29/04 137/614.03 |
| 2006/0038401 A1* | 2/2006 | Kleinbeckel et al. ....................... | F16L 29/002 285/321 |
| 2013/0146146 A1 | 6/2013 | Sethre | |

FOREIGN PATENT DOCUMENTS

| | | |
|---|---|---|
| JP | 2007-255836 A | 10/2007 |
| WO | 2009/050173 A1 | 4/2009 |
| WO | 2009/071591 A2 | 6/2009 |
| WO | 2015/114058 A1 | 8/2015 |
| WO | 2016/052375 A1 | 4/2016 |

* cited by examiner

EMERGENCY DETACHMENT DEVICE OF FLUID HANDLING DEVICE

CROSS REFERENCE TO RELATED APPLICATIONS

This application is a National Stage of International Application No. PCT/JP2016/070171 filed Jul. 7, 2016, claiming priority based on Japanese Patent Application No. 2015-139092 filed Jul. 10, 2015, the contents of all of which are incorporated herein by reference in their entirety.

TECHNICAL FIELD

The present invention relates to an emergency detachment device of a fluid handling device that is suited to handling fluids, and in particular is suited to handling extremely-low-temperature fluids such as liquid hydrogen.

BACKGROUND ART

In recent years, as the problem of global warming has grown more serious, efforts are being made to expand the use of natural energy sources (renewable energy sources) such as sunlight, wind power, water power, and geothermal energy as energy sources to replace fossil fuels such as petroleum and natural gas. Such natural energy is at present being converted almost entirely into energy in electrical forms, but electricity is unsuited to storage in large amounts, and transport losses are also large. Accordingly, in recent years the possibility is being studied of employing natural energy sources to produce and effectively use hydrogen, which can be stored in large amounts and transported over long distances, as hydrogen energy.

In addition to the merits of enabling storage and transport, hydrogen is present in inexhaustible amounts on the earth in the form of water and various compounds, and provides large amounts of power as energy used in rocket fuel and the like. Moreover, even when combusted, only water is generated upon reaction with oxygen in air, so that hydrogen is a clean energy source that does not entail emission of carbon dioxide or atmospheric pollutants, among other advantages.

Moreover, because there are quantitative limits to natural energy sources within Japan, the future possibilities of using natural energy sources within Japan to produce large quantities of hydrogen, and of storing and transporting same to resolve energy problems within Japan, are being studied.

Given this background, in conjunction with expansion of the use of hydrogen, establishment of technology to store and transport hydrogen is an urgent matter, and one matter related thereto is the development of a fluid handling device (loading arm) for handling liquid hydrogen.

Such a fluid handling device is used for tasks to handle various fluids, such as liquefied natural gas or liquefied petroleum gas, between tankers at sea and storage facilities on land. In the past, due to unpredictable movement of the tanker resulting from strong winds, storm surges, tsunamis, or the like, rupture of the fluid transport line between fluid handling devices on the sea side and on the land side has occurred, with the possibility of exterior outflow of the fluid being transported. Accordingly, in order to prevent the occurrence of such problems, or, in the event that a conflagration or other unforeseen situation has occurred on either the sea side or on the land side, in order to prevent the spread of damage to the other side, an emergency detachment device is provided to rapidly shut off the transport (passage) of fluid in an emergency using an emergency shutoff valve. After it is ensured that the fluid is flowing to the exterior, the transport line is separated both on the sea side and on the land side, to reduce the loads born by the transport line on both the sea side and on the land side.

DISCLOSURE OF THE INVENTION

Problems to be Solved by the Invention

Hydrogen is a gas at normal temperature, and in a gaseous state the volume is large, which is unsuitable for storage and transport. Accordingly, in general, hydrogen is stored and transported in a liquefied state.

The boiling point of hydrogen is $-253°$ C., and therefore the temperature must be set to $-253°$ C. or lower for liquefaction. Moreover, because liquefied hydrogen evaporates extremely readily, during storage and transport of liquid hydrogen, it is essential that an environment of $-253°$ C. or lower be maintained.

However, emergency detachment devices of the prior art have poor heat insulation performance, and heat that has entered from the exterior easily propagates to the fluid. Accordingly, when passing liquid hydrogen, there is the problem that heat due to the outside air temperature raises the liquid temperature of the liquid hydrogen being passed, liquid hydrogen being passed evaporates and assumes a gaseous state, and efficient transport is not possible.

Further, by passing liquid hydrogen at an extremely low temperature, the surface temperature of the device becomes equal to the temperature of the liquid hydrogen ($-253°$ C.), and consequently oxygen (boiling point: $-183°$ C.) present in the vicinity of piping liquefies and accumulates in the vicinity of the fluid handling device. Further, when an emergency detachment action is performed, and the couplers connecting the piping on the sea side and on the land side separate, the valve that shuts off the fluid enters an exposed state, but the surface temperature of the exposed valve itself also reaches the liquid hydrogen temperature ($-253°$ C.); therefore, oxygen (boiling point: $-183°$ C.) present near the exposed valve liquefies and accumulates in the vicinity. Because the liquid oxygen is susceptible to combustion, its presence in the vicinity of liquid oxygen, which is a combustion-susceptible gas, presents an extreme hazard in the event of flame being produced due to some adverse circumstance.

It is an object of the present invention to propose an unprecedented, innovative and exceptionally stable emergency detachment device of a fluid handling device that resolves such problems, the heat insulation in both the connected state and the separated state being exceptional, it being possible to efficiently handle fluids while evaporation of the fluid being handled is reduced to the extent possible, temperatures at the device surface being prevented from being extremely low, liquefaction of oxygen present in the vicinity of the device being suppressed, and combustion-susceptible liquid oxygen being prevented from forming.

Means to Solve the Problems

The main point of the present invention shall now be described with reference to the accompanying drawings.

The present invention relates to an emergency detachment device of a fluid handling device, the emergency detachment device being configured so that a first coupler 2 and second coupler 3, each of which being provided with a valve 1 for shutting off the passage of fluid that is being passed within handling piping and preventing the fluid from flowing out to the exterior, are detachably connected by a connection mechanism 4 to allow emergency detachment to be performed, and the emergency detachment device being configured so that, in an emergency, the valves 1 of each of the first coupler 2 and the second coupler 3 operate to enter a closed-valve state and shut off passage of the fluid, the connection mechanism 4 disestablishes the connection between the first coupler 2 and the second coupler 3, and the first coupler 2 and the second coupler 3 separate, wherein the emergency detachment device of a fluid handling device is characterized in that: each of the first coupler 2 and the second coupler 3 is formed in a vacuum dual-layer structure, in which an inner pipe section 5 through which the fluid passes is covered by an outer pipe section 6, and in which the space between the inner pipe section 5 and the outer pipe section 6 is placed in a vacuum state, and two of the valves are provided in series within the inner pipe section 5 in the direction in which the fluid passes; the emergency detachment device of a fluid handling device is provided with a remaining-fluid-transferring mechanism for causing residual fluid that remains on the coupler-opening side of second valves 1B to be transferred into the inner pipe sections 5, which are further inward than the second valves 1B, after the second valves 1B have both assumed the closed-valve state during emergency detachment, the second valves 1B being, among the two valves 1 provided in series within the inner pipe section 5, provided further inward than first valves 1A, which are provided on the coupler-opening sides; the remaining-fluid-transferring mechanism is configured so that a gas for fluid transfer is introduced into a residual fluid section, in which the residual fluid remains, via a section for introduction of gas for fluid transfer 7 provided in the inner pipe section 5 on the coupler-opening side of the second valve 1B, the residual fluid is discharged from the residual fluid section, and the residual fluid is transferred via a transfer piping section 8 into the inner pipe section 5 provided further inward than the second valve of one or both of the first coupler 2 and the second coupler 3; and in an emergency detachment action completion state in which the first valves 1A and the second valves 1B are in the closed-valve state and the first coupler 2 and the second coupler 3 are separated, the space sections partitioned and formed by each of the first valves 1A and the second valves 1B in the closed-valve state in the first coupler 2 and the second coupler 3 become heat insulation sections 9, heat conduction to the inner pipe sections 5 and the second valves 1B is reduced to the extent possible by the heat insulation sections 9 and vacuum sections 10 between the inner pipe sections 5 and the outer pipe sections 6, evaporation of fluid within the inner pipe sections 5 is prevented, the conduction of coldness of the fluid to the outer pipe sections 6 and the first valves 1A is reduced to the extent possible, and the coupler surfaces are prevented from reaching extremely low temperatures.

A second aspect of the present invention relates to the emergency detachment device of a fluid handling device according to the first aspect, characterized in that the fluid is liquid hydrogen, and the gas for fluid transfer is helium gas.

A third aspect of the present invention relates to the emergency detachment device of a fluid handling device according to the first or second aspects, characterized in that: during emergency detachment, the second valves 1B of each of the first coupler 2 and the second coupler 3 enter the closed-valve state, and residual fluid that remains in the space between the second valve 1B of the first coupler 2 and the second valve 1B of the second coupler 3, which are in the closed-valve state, is transferred by the remaining-fluid-transferring mechanism to the inner pipe section 5 provided further inward than the second valve 1B of one or both of the first coupler 2 and the second coupler 3; the space between the second valve 1B of the first coupler 2 and the second valve 1B of the second coupler 3 is replaced with the gas for fluid transfer, whereupon the first valves 1A of each of the first coupler 2 and the second coupler 3 are caused to assume the closed-valve state, and the heat insulation sections 9 are formed in the space between the first valves 1A and the second valves 1B; and after the heat insulation sections 9 have been formed, the connection established by the connection mechanism 4 is disestablished, the first coupler 2 and the second coupler 3 are separated, and emergency detachment is performed.

A fourth aspect of the present invention relates to the emergency detachment device of a fluid handling device according to the first or second aspects, characterized in that: during emergency detachment, the connection established by the connection mechanism 4 is disestablished and the first coupler 2 and the second coupler 3 are separated, and the first valves 1A and the second valves 1B of both the first coupler 2 and the second coupler 3 enter the closed-valve state through the separating of the first coupler 2 and the second coupler 3; residual fluid that remains in the space between the first valves 1A and the second valves 1B that are in the closed-valve state in each of the first coupler 2 and the second coupler 3 is transferred into the inner pipe sections 5 provided inward of the second valves 1B by the remaining-fluid-transferring mechanism; and the space between the first valves 1A and the second valves 1B in each of the first coupler 2 and the second coupler 3 is replaced with the gas for fluid transfer, the heat insulation sections 9 being formed between the first valves 1A and the second valves 1B.

Advantageous Result of the Invention

Since the present invention is configured as described above, in the state in which the first coupler and the second coupler are connected (during fluid handling), heat conduction between the inner pipe sections and the outer pipe sections is blocked by the vacuum sections provided between the inner pipe sections and the outer pipe sections, and excellent heat insulation performance is exhibited.

Further, in the state in which the first coupler and the second coupler are separated (the state after emergency detachment), heat conduction between the inner pipe sections and the outer pipe sections is blocked by the vacuum sections, and moreover heat conduction between the first valves and the second valves is reduced to the extent possible by the heat insulation sections formed between the first valves and the second valves, so that, as with the connected state, excellent heat insulation performance is exhibited.

Hence, for example, even when handling liquid hydrogen or other extremely low temperature fluids, which evaporate extremely easily and are difficult to handle, it is possible, inter alia, to reduce evaporation of the fluid to the greatest extent possible and allow efficient handling, and prevent the incidence of problems such as piping breakage due to volume expansion resulting from evaporation. It is also possible to prevent the surface of the emergency detachment device from reaching extremely low temperatures due to the coldness of the fluid, prevent liquefaction of oxygen that is present in the vicinity of the device and due to the device surface having reached an extremely low temperature, and prevent generation of combustion-susceptible liquid oxygen. Even if a fire or some other adverse circumstance were to occur, the spread of damage can be avoided.

Further, through a dual valve structure of a first valve and a second valve, even if a problem occurs with the second valve and a fluid blocked from passing by the second valve were to leak, any fluid that had leaked into the heat insulation section would be gasified and impeded from escaping by the first valve; therefore, leakage of fluid to the exterior would be prevented. It is thereby possible to reduce, to the extent possible, any danger of a worker coming into contact with leaked fluid.

Thus, the present invention relates to an innovative and unprecedented emergency detachment device of a fluid handling device that is exceptionally safe.

The invention according to the second aspect is a high-practicality emergency detachment device of a fluid handling device in which, even when handling liquid hydrogen, the use of helium gas as the gas for fluid transfer makes it possible for liquid hydrogen that remains fluid in an inner pipe section to be satisfactorily transferred without freezing of the gas for fluid transfer.

The invention according to the third aspect is an emergency detachment device of a fluid handling device with yet a higher level of safety, in which the amount of fluid that leaks to the exterior from inner pipe sections when the first coupler and the second coupler are separated during emergency detachment can be reduced to the extent possible.

The invention according to the fourth aspect is a high-practicality emergency detachment device of a fluid handling device that can easily be designed and realized, in which, for example, in a state in which the first coupler and the second coupler are connected, an open-valve state is entered by the pressing-together of valves (the first valves) causing contraction of an urging body in opposition to extension urging. When, during emergency detachment, the connection produced by the connection mechanism is disestablished and a state is entered in which separation is possible, the force pressing the valves against each other no longer acts, and a valve-closing action is instantly performed on each of the valves (first valves and second valves) through the extension urging of the urging body, so that each of the valves is switched automatically into the closed-valve state. As a result, complicated action mechanisms and driving sections to cause opening and closing actions of the valves are not necessary.

BEST MODE FOR CARRYING OUT THE INVENTION

Figure 1:
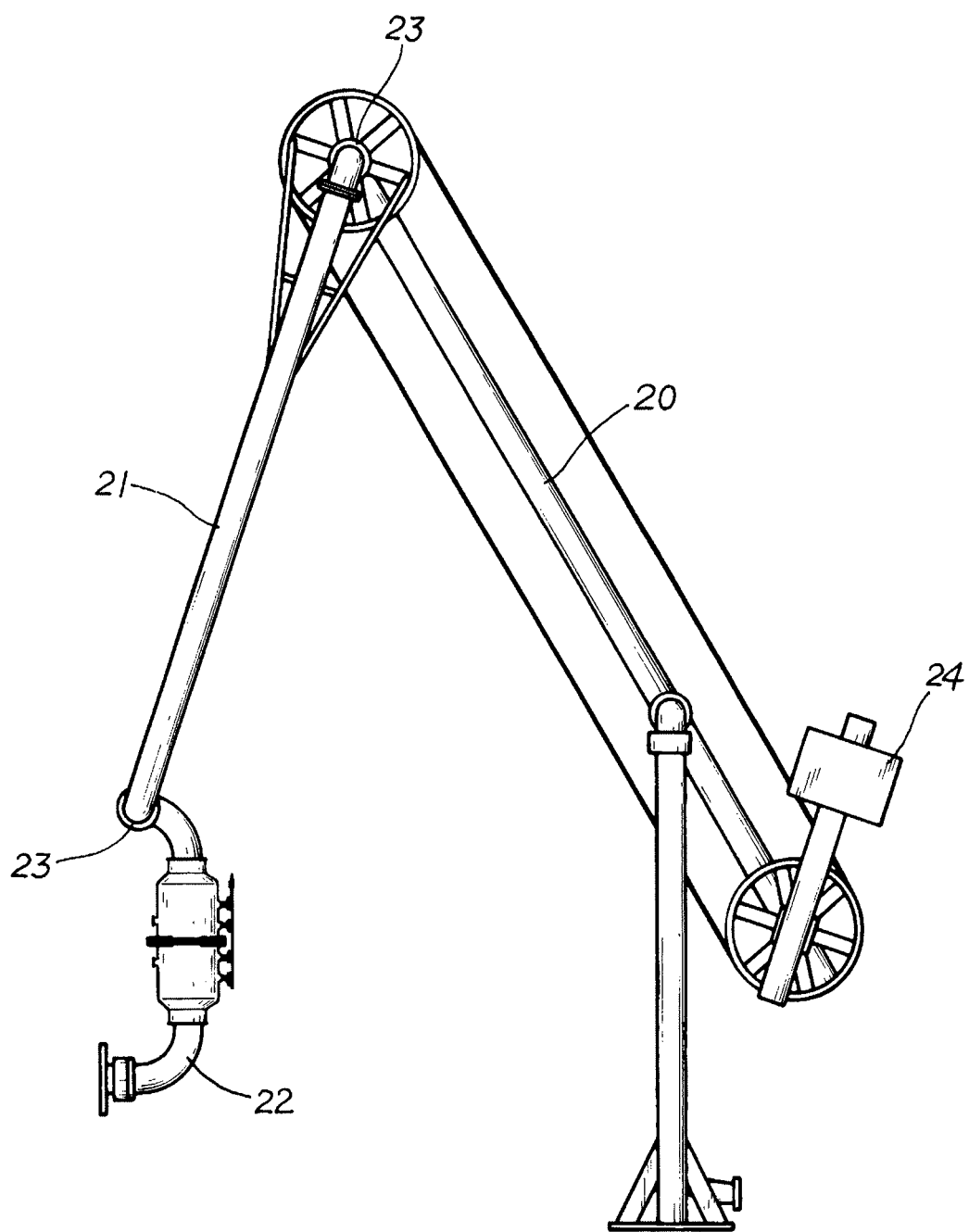
FIG. 1 is a summary diagram showing the fluid handling device of Embodiment 1.

Preferred embodiments of the present invention are briefly described below with reference to the diagrams while indicating the effects of the present invention.

During emergency detachment, for example, first, the second valves 1B of each of the first coupler 2 and the second coupler 3 assume a closed-valve state, to shut off the passage of fluid.

Then, gas for fluid transfer is introduced by a fluid transfer mechanism into inner pipe sections 5 on the inside, partitioned by the second valve 1B of the first coupler 2 and the second valve 1B of the second coupler 3, which are in the closed-valve state. Residual fluid that remains within the inner pipe sections 5 partitioned by the second valves 1B is discharged from within the inner pipe sections 5, the discharged residual fluid is transferred via a transfer piping section 8 into the inner pipe section 5 provided further inward than the second valve 1B of one or both of the first coupler 2 and the second coupler 3, and a state is entered in which the inner pipe section 5 partitioned by the second valves 1B is replaced with gas for fluid transfer (state of injection of gas for fluid transfer).

After discharge of the residual fluid within the inner pipe sections 5 partitioned by the second valves 1B and replacement with the gas for fluid transfer have been completed, the first valves 1A of each of the first coupler 2 and the second coupler 3 enter into the closed-valve state, and in each of the first coupler 2 and the second coupler 3, a space section is formed by partitioning by the first valve 1A and the second valve 1B in the closed-valve state. After the space sections have been formed, the connection mechanism 4 performs a connection-disestablishing action, the connection of the first coupler 2 and the second coupler 3 is disestablished, and the first coupler 2 and second coupler 3 separate to complete the emergency detachment.

In the present invention, by performing emergency detachment as described above, when the first coupler 2 and the second coupler 3 are separated, fluid is prevented from flowing to the exterior, and scattering to the vicinity.

Further, in the state of completion of the emergency detection action in which the first valves 1A and the second valves 1B of each of the first coupler 2 and second coupler 3 are closed and moreover the first coupler 2 and the second coupler 3 are separated, in each of the first coupler 2 and the second coupler 3, heat conduction between the inner pipe section 5 and the outer pipe section 6 is blocked and heat insulation performance is improved by a vacuum section 10 provided between the inner pipe section 5 and the outer pipe section 6. Also, the space sections formed by partitioning by the first valves 1A and the second valves 1B in the closed-valve state become heat insulation sections 9 that have a heat-insulating function, so that heat conductivity between the first valves 1A and the second valves 1B is reduced by the heat insulation sections 9 and heat insulation performance is improved. Accordingly, the first coupler 2 and the second coupler 3 each exhibit excellent heat insulation performance even in the separated state, and consequently heat conduction from the exterior to the fluid within the inner pipe sections 5 is suppressed to the extent possible. Moreover, conduction of coldness of the fluid within the inner pipe sections 5 to the outer pipe sections 6 and to the first valves 1a is suppressed to the extent possible.

As a result, for example, even when handling liquid hydrogen, which is an extremely-low-temperature fluid and evaporates easily and is very difficult to handle, almost no heat from the outside air is conducted to within the inner pipe sections 5. Accordingly, there is almost no rise in temperature of the liquid hydrogen within the inner pipe sections 5, evaporation of liquid hydrogen is reduced to the extent possible, and it becomes possible to prevent problems arising from evaporation of the liquid hydrogen; e.g., increases in pressure due to volume expansion, causing breakage to the piping of the fluid handling device and to the emergency detachment device itself.

Further, there is hardly any conduction of coldness of the liquid hydrogen within the inner pipe sections 5 to the outer pipe sections 6 or the first valves 1A, and therefore the occurrence of extremely low temperatures in the outer pipe sections 6 and the first valves 1A due to the liquid hydrogen, or in other words, of extremely low temperatures near the surfaces of the first coupler 2 and the second coupler 3, is prevented, liquefaction of oxygen present in the vicinity of the first coupler 2 and the second coupler 3 is suppressed, and the falling and accumulation of combustion-susceptible liquid oxygen is prevented. Accordingly, even if an unlikely adverse incident such as fire should occur, the spread of damage can be suppressed.

Thus, the present invention relates to an innovative and unprecedented emergency detachment device of a fluid handling device that exhibits excellent safety even after emergency detachment.

Embodiment 1

A specific Embodiment 1 of the present invention is described, referring to FIG. 1 to FIG. 7.

The present embodiment relates to an emergency detachment device mounted on a fluid handling device, in which, as illustrated in FIG. 1, an inboard arm 20, outboard arm 21, and handling piping such as a joint tip section 22 are rotatably connected by a swivel joint 23, and a balance weight mechanism 24 that balances according to the rotational orientation of the outboard arm 21 with respect to the inboard arm 20. A first coupler 2 and second coupler 3, each provided with a valve 1 that shuts off the flow of fluid being passed within the handling piping and prevents exterior outflow of fluid, are detachably connected by a connection mechanism 4 to enable emergency detachment. During an emergency, the valves 1 of the first coupler 2 and the second coupler 3 operate to enter the closed-valve state and shut off the passage of fluid, and the connection mechanism 4 disestablishes the connection between the first coupler 2 and second coupler 3 so that the first coupler 2 and the second coupler 3 separate.

The emergency detachment device of a fluid handling device of the present embodiment is configured as an emergency detachment device of a fluid handling device for liquid hydrogen to handle liquid hydrogen, and more specifically, in each of the first coupler 2 and the second coupler 3, an inner pipe section 5 through which liquid hydrogen passes is covered by an outer pipe section 6, in a vacuum dual-layer structure in which a vacuum section 10 is provided between the inner pipe section 5 and the outer pipe section 6. Within the inner pipe section 5, a first valve 1A and a second valve 1B are provided in series in the direction of passage of fluid. During emergency detachment, the second valves 1B of each of the first coupler 2 and the second coupler 3 enter the closed-valve state, and remaining liquid hydrogen that remains between the second valve 1B of the first coupler 2 and the second valve 1B of the second coupler 3, which are in the closed-valve state, is transferred by a remaining-fluid-transferring mechanism into the inner pipe section 5 further inward than the second valve 1B of one or both of the first coupler 2 and the second coupler 3. The space between the first second valve 1B of the first coupler 2 and the second valve 1B of the second coupler 3 is replaced with gas for fluid transfer, after which the first valves 1A in each of the first coupler 2 and the second coupler 3 are caused to assume the closed-valve state. Heat insulating sections 9 are formed between the first valves 1A and the second valves 1B, and after the heat insulation sections 9 are formed, the connection of the connection mechanism 4 is disestablished and the first coupler 2 and second coupler 3 are separated to perform emergency detachment.

Below, the constituent sections of the present embodiment are described in detail.

Figure 2:
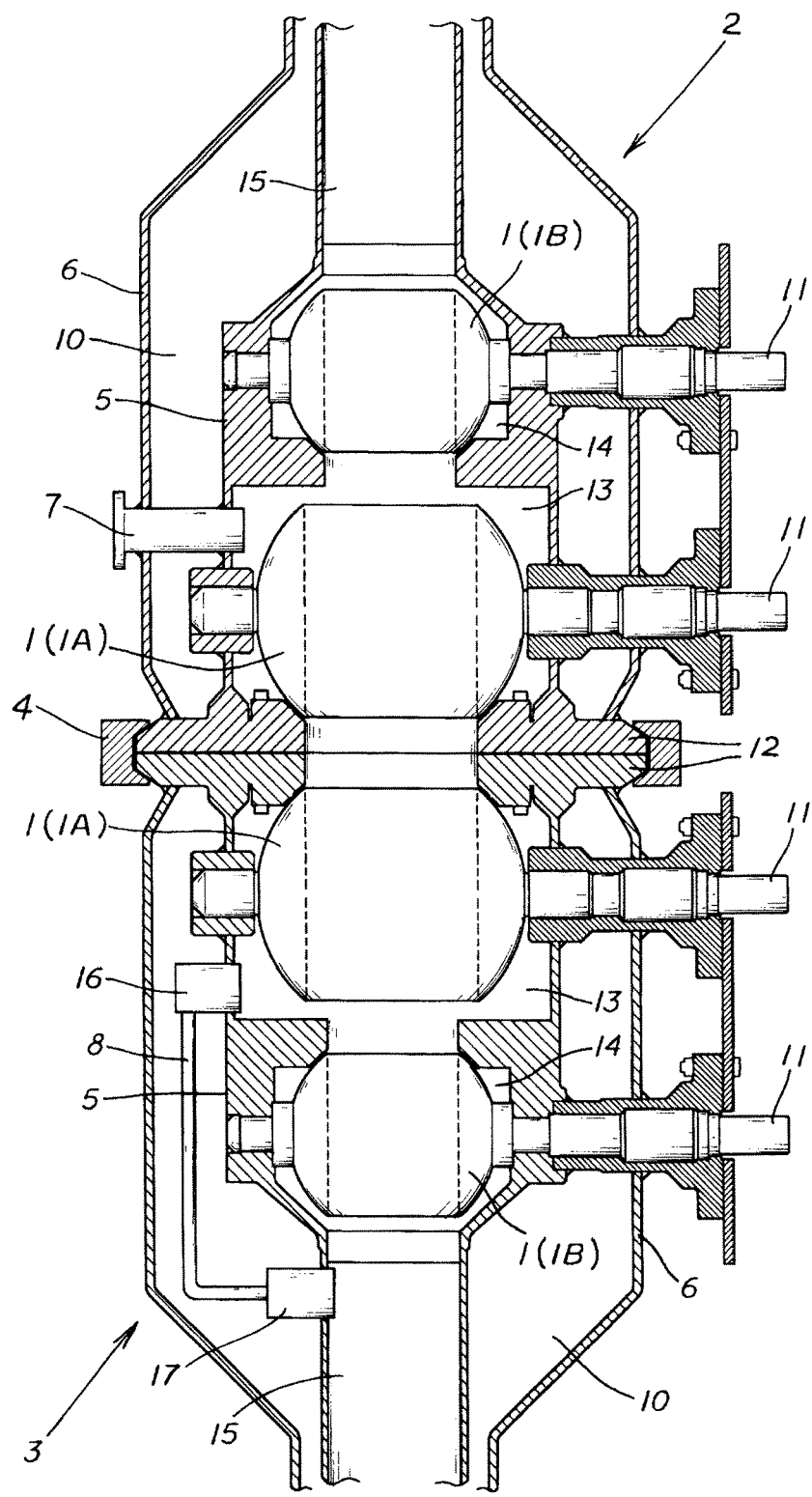
FIG. 2 is a descriptive front cross-sectional view showing the emergency detachment device of Embodiment 1.

As illustrated in FIG. 2, in the present embodiment, ball valves are used for the first valves 1A and the second valves 1B, and each of the first valves 1A and the second valves 1B is provided connected with a driving shaft 11 to enable open/close rotation.

Further, the inner pipe sections 5 of each of the first coupler 2 and the second coupler 3, configured with a vacuum dual-layer structure, comprise a first fluid passage section 13 in which is arranged a first valve 1A provided on the coupler-opening side (the side abutting and connecting with the other coupler) on which is provided a flange 12, a second fluid passage section 14 in which is arranged a second valve 1B provided on the coupler base end side (the side provided connected with the handling piping), and a piping-connection pipe section 15, provided connected with the second fluid passage section 14, and provided connected with an inner pipe of vacuum dual-structure handling piping.

Further, the remaining-fluid-transferring mechanism introduces gas for fluid transfer into a residual fluid section (between the second valve 1B of the first coupler 2 and the second valve 1B of the second coupler 3, which are in the closed-valve state), in which remaining liquid hydrogen remains, the gas for fluid transfer being introduced via a section for introduction of gas for fluid transfer 7 provided in an inner pipe section 5 on the coupler-opening side of the second valve 1B, and discharges remaining liquid hydrogen from the residual fluid section. The remaining-fluid-transferring mechanism transfers remaining liquid hydrogen via a transfer piping section 8 into the inner pipe section 5 further inward than the second valve 1B of one or both of the first coupler 2 and the second coupler 3.

Specifically, in the remaining-fluid-transferring mechanism of the present embodiment, a gas introduction section 7 with a check-valve structure is provided in a first fluid passage section 13 of the first coupler 2, a fluid discharge section 16 with a check-valve structure is provided in a first fluid passage section 13 of the second coupler 3, a fluid introduction section 17 with a check-valve structure is provided in the piping-connection pipe section 15 of the second coupler 3, and the fluid discharge section 16 and fluid introduction section 17 provided in the second coupler 3 are caused to assume a state of communication via the transfer piping section 8. During emergency detachment, after the closing of the second valves 1B in each of the first coupler 2 and the second coupler 3, helium gas, which is the gas for fluid transfer, is introduced from the gas introduction section 7 into the inner pipe sections 5 partitioned by the second valves 1B in the closed-valve state (within the first fluid passage section 13 of the first coupler 2 and the first fluid passage section 13 of the second coupler 3, which are in a state of communication). Remaining liquid hydrogen that has remained within the first fluid passage section 13 of the first coupler 2 and the first fluid passage section 13 of the second coupler 3, which are in a state of communication, is discharged from the fluid discharge section 16, and the remaining liquid hydrogen that has been discharged from the fluid discharge section 16 is transferred, via the transfer piping section 8, from the fluid introduction section 17 into the piping-connection pipe section 15, which is the inner pipe section 5 provided further inward than the second valve 1B in the second coupler 3, and the interior of the first fluid passage section 13 of the first coupler 2 and the first fluid passage section 13 of the second coupler 3, which are in a state of communication, is replaced with helium gas.

The connection mechanism 4 is configured to form a clamp shape. Flange sections 12 of each of the first coupler 2 and the second coupler 3, in the abutting state, are fitted and locked so as to be enclosed in the circumferential direction. The first coupler 2 and the second coupler 3 are connected and held, and the fitted and locked state is disestablished by a connection disestablishing operation mechanism.

The actions and effects of the present embodiment, configured as described above, are described below.

Figure 3:
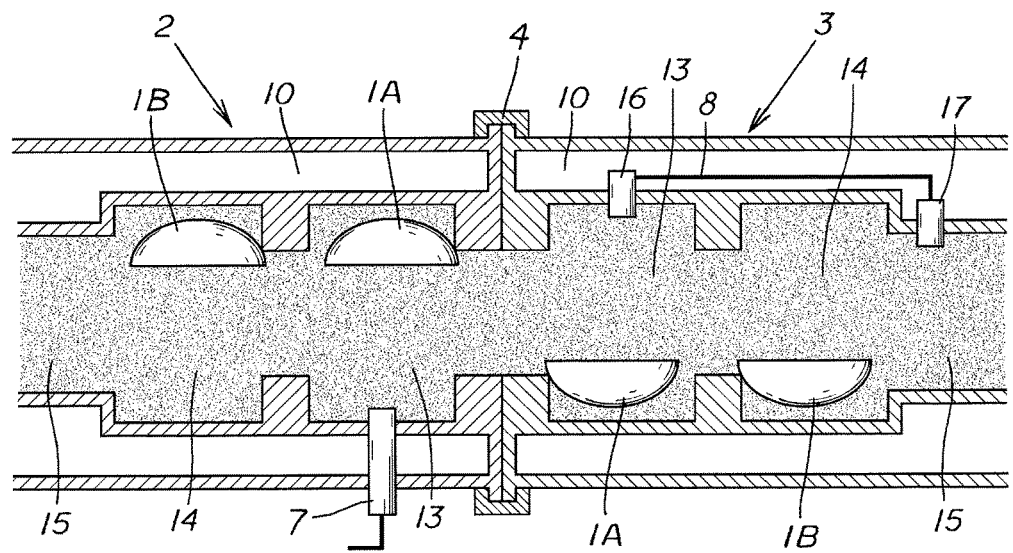
FIG. 3 illustrates the action during emergency detachment in Embodiment 1.

FIG. 3 illustrates the normal state during fluid handling. The first valves 1A and the second valves 1B of the first coupler 2 and second coupler 3 are in the open-valve state, and the first fluid passage section 13, second fluid passage section 14, and piping-connection pipe section 15 of the first coupler 2, and the first fluid passage section 13, second fluid passage section 14, and piping-connection pipe section 15 of the second coupler 3, are in the communicating state.

Figure 4:
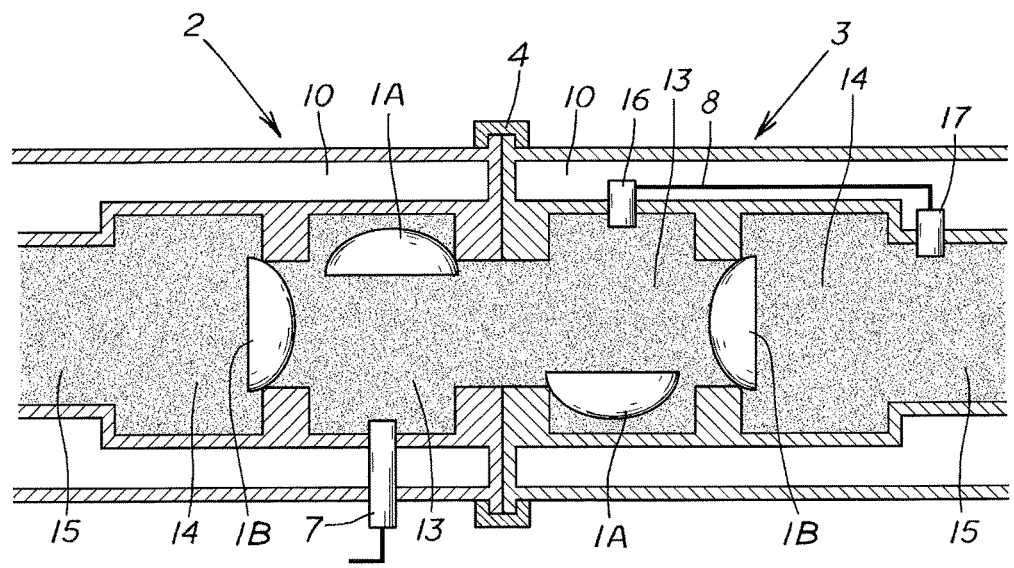
FIG. 4 illustrates the action during emergency detachment in Embodiment 1.

During emergency detachment, starting from the state of FIG. 3 described above, first, the second valves 1B of the first coupler 2 and second coupler 3 are closed, as illustrated in FIG. 4, to shut off the flow of liquid hydrogen that was being passed.

Figure 5:
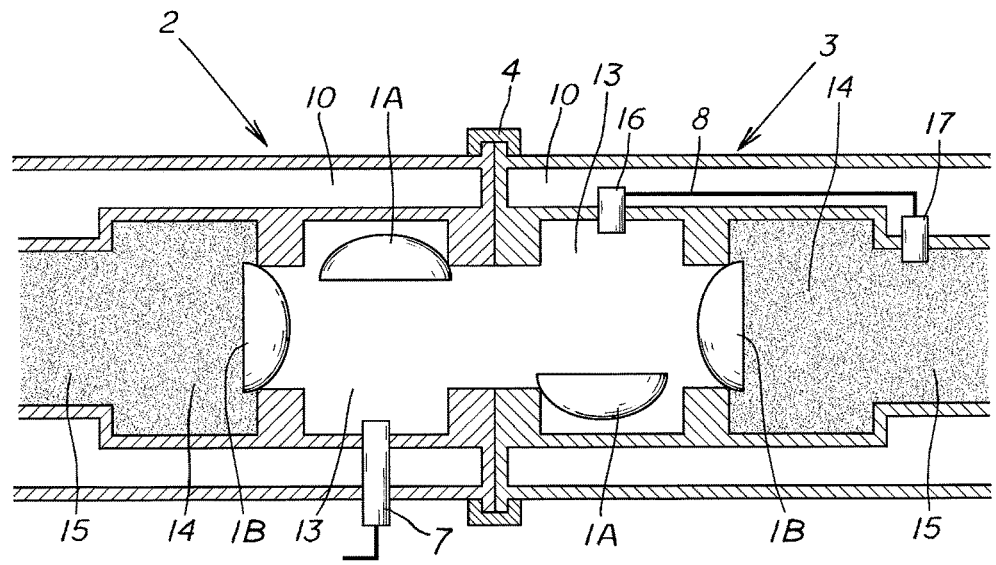
FIG. 5 illustrates the action during emergency detachment in Embodiment 1.

Next, as illustrated in FIG. 5, helium gas is introduced from the gas introduction section 7 provided in the first coupler 2 into the first fluid passage section 13 of the first coupler 2. Remaining liquid hydrogen that remains within the inside of the inner pipe sections 5 on the inside partitioned by the second valves 1B; that is, in the first fluid passage section 13 of the first coupler 2 and the first fluid passage section 13 of the second coupler 3, which are in a state of communication, is discharged from the fluid discharge section 16 provided in the first fluid passage section 13 of the second coupler 3, and is introduced (transferred) via the transfer piping section 8 to the inward side of the second valve of the second coupler 3; i.e., into the piping-connection pipe section 15 from the fluid introduction section 17 provided in the piping-connection pipe section 15. The normal-state first fluid passage section 13 of the first coupler 2 and first fluid passage section 13 of the second coupler 3 assume a state (helium gas injection state) in which the residual fluid is replaced with helium gas.

Figure 6:
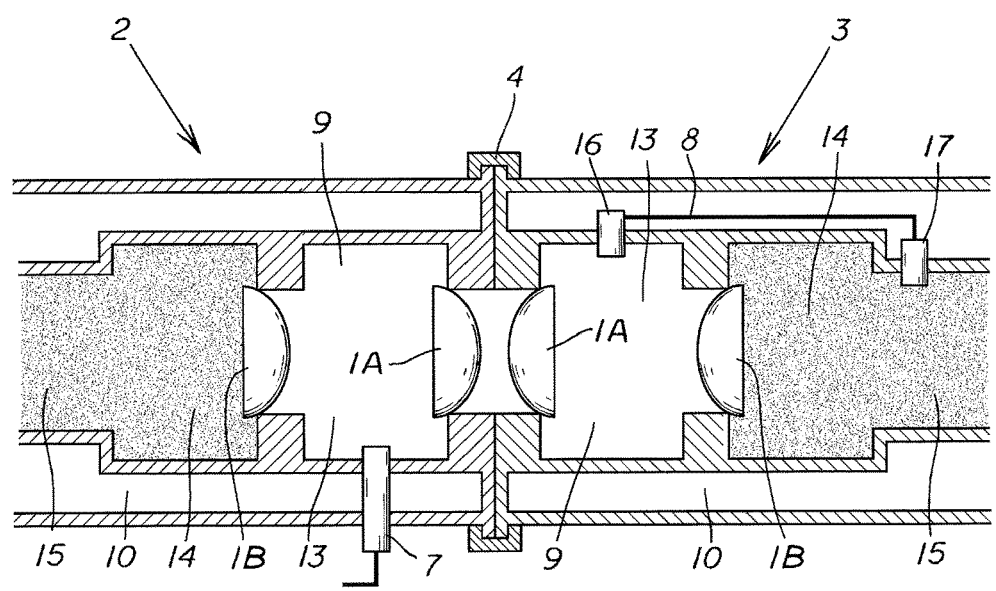
FIG. 6 illustrates the action during emergency detachment in Embodiment 1.

When replacement with helium gas within each of the first fluid passage sections 13 of the first coupler 2 and second coupler 3 is completed, the first valves 1A of the first coupler 2 and second coupler 3 are opened, as illustrated in FIG. 6.

Figure 7:
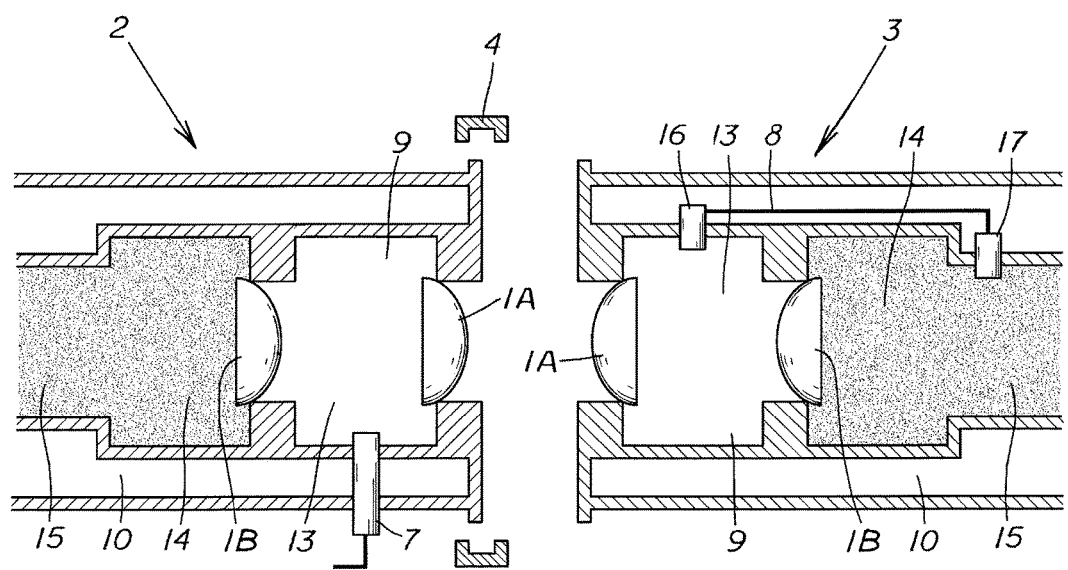
FIG. 7 illustrates the action during emergency detachment in Embodiment 1.

Then, after the first valves 1A have closed, the connection mechanism 4 is disengaged from the flange sections 12, connection of the first coupler 2 and second coupler 3 is disestablished, the first coupler 2 and second coupler 3 are separated, and the emergency detachment action is completed, as shown in FIG. 7.

In the present embodiment, as described above, the remaining liquid hydrogen within the first fluid passage sections 13 that are connected sections of the first coupler 2 and second coupler 3 is transferred into the piping-connection pipe section 15 of the second coupler 3, so that with the first valves 1A in the closed state, no liquid hydrogen remains on the outside (the coupler-opening side) of the first valves 1A. Therefore, when the first coupler 2 and the second coupler 3 are separate, there is no scattering of remaining liquid hydrogen to the vicinity, and the separation action is safely performed.

Further, in the state in which the emergency detachment action is completed and the first coupler 2 and second coupler 3 have been separated, in both the first coupler 2 and the second coupler 3, heat conduction between the inner pipe section 5 and the outer pipe section 6 is blocked by the vacuum section 10 provided between the inner pipe section 5 and the outer pipe section 6, and the first fluid passage section 13 formed by partitioning by the first valve 1A and the second valve 1B in the closed-valve state and into which helium gas has been injected becomes a heat insulation section 9 having a heat insulation action. Heat conductivity between the first valve 1A and the second valve 1B is reduced by the heat insulation section 9, and heat insulation performance between the first valve 1A and the second valve 1B is improved.

Hence, even when the first coupler 2 and the second coupler 3 are both in the separated state, through the heat insulation effect of the heat insulation sections 9 and the vacuum sections 10, heat conduction from outside to the liquid hydrogen within the inner pipe sections 5 is suppressed to the extent possible, and conduction of the coldness of the liquid hydrogen within the inner pipe sections 5 to the outer pipe sections 6 and the first valves 1A is suppressed to the extent possible.

As a result, there is almost no rise in the temperature of liquid hydrogen within the inner pipe sections 5, evaporation of liquid hydrogen is reduced to the extent possible, and problems arising due to evaporation of liquid hydrogen (e.g., an increase in pressure due to volume expansion and breakage of piping of the fluid handling device and of the emergency detachment device itself) can be prevented.

Further, there is almost no conduction of the coldness of the liquid hydrogen within the inner pipe sections 5 to the outer pipe sections 6 or the first valves 1A. This prevents the temperature of the outer pipe sections 6 and the first valves 1A from falling to extremely low levels due to the liquid hydrogen; i.e., prevents the vicinities of the surfaces of the first coupler 2 and the second coupler 3 from reaching extremely low temperatures, suppresses liquefaction of oxygen present near the first coupler 2 and the second coupler 3, and prevents combustion-susceptible liquid oxygen from falling and accumulating in the vicinity. Accordingly, even in an unlikely adverse incident such as fire, the spread of damage can be avoided.

Embodiment 2

A specific Embodiment 2 of the present invention is described on the basis of FIGS. 8 to 12.

The present embodiment relates to a case in which valves 1 different from those in Embodiment 1 are used, and an emergency detachment action different from that in Embodiment 1 is performed. Below, the present embodiment is described in detail.

Figure 8:
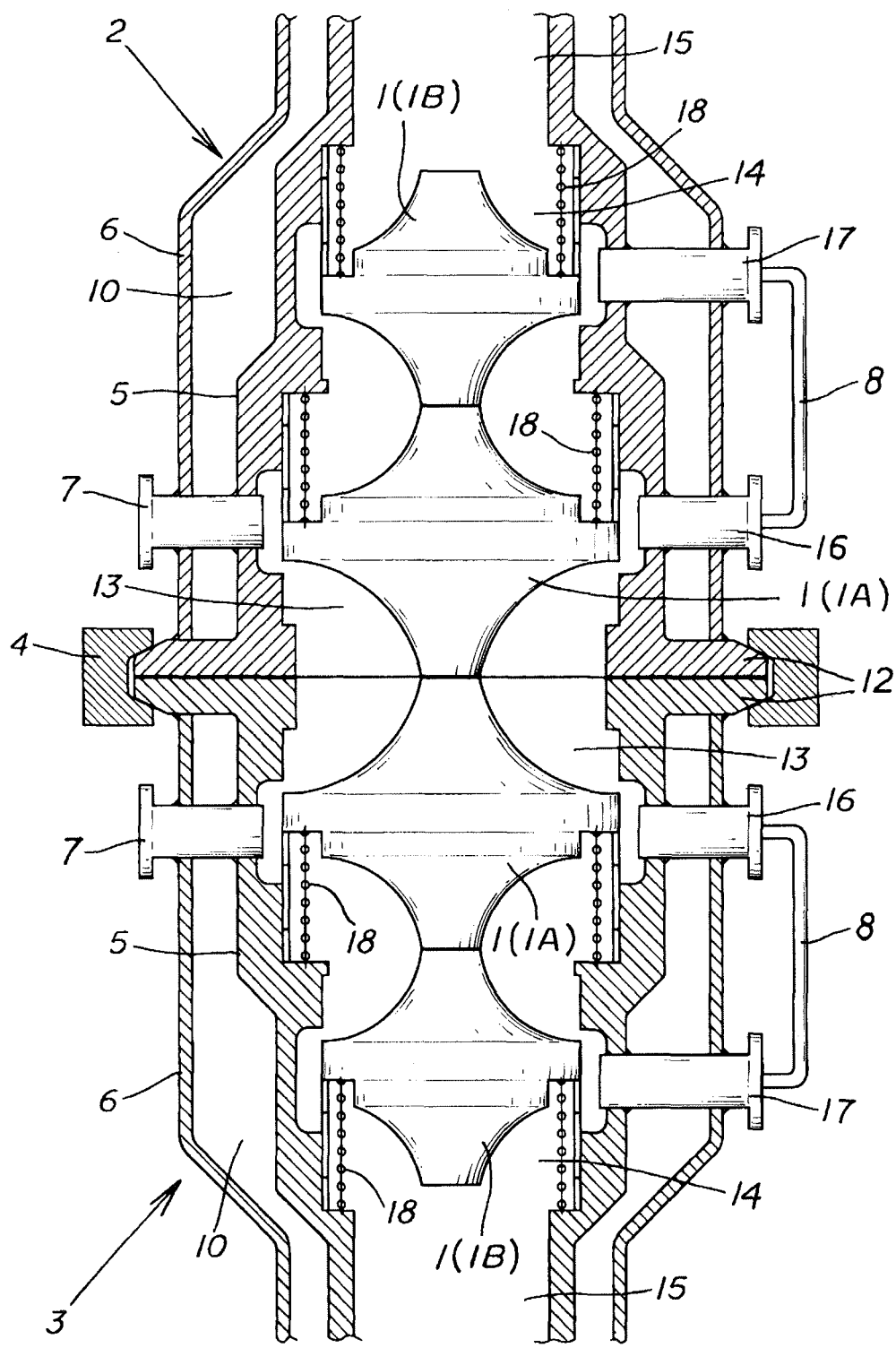
FIG. 8 is a descriptive front cross-sectional view showing the emergency detachment device (connected state) of Embodiment 2.
Figure 9:
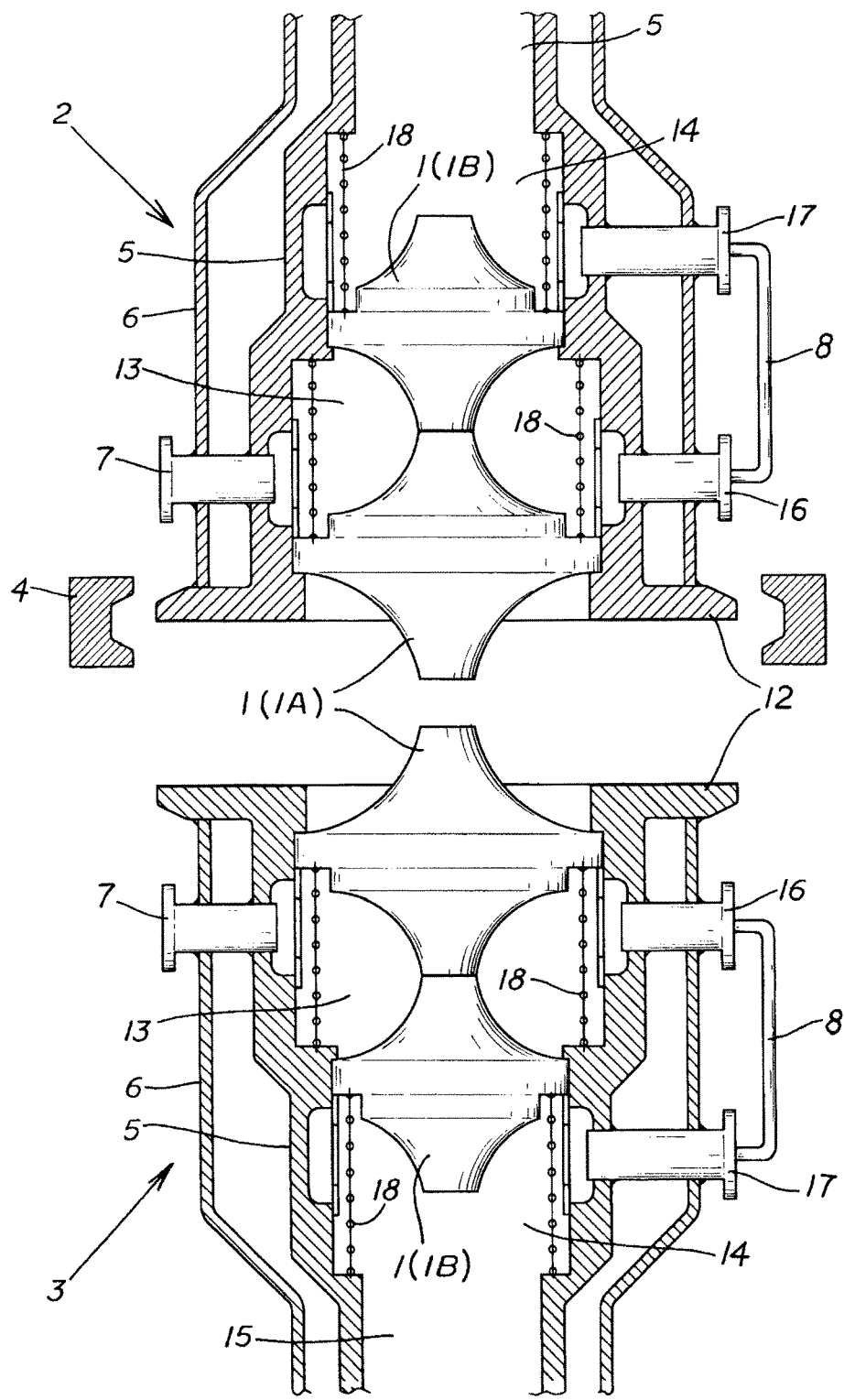
FIG. 9 is a descriptive front cross-sectional view showing the emergency detachment device (separated state) of Embodiment 2.

As illustrated in FIGS. 8 and 9, in the present embodiment, check valves (non-return valves) are used as the valves 1, and in both the first coupler 2 and the second coupler 3, the first valve 1A and the second valve 1B were provided connected in series.

Further, in the present embodiment, in the state in which the first coupler 2 and the second coupler 3 are connected, the pressing-together of the first valves 1A causes contraction of urging bodies 18, in opposition to extension urging, whereby the first valves 1A and the second valves 1B are each put into the open-valve state. When the connection established by the connection mechanism 4 is disestablished during emergency detachment and a state in which separation is possible is entered, the force causing the first valves 1A to be pressed against each other disappears, the first valves 1A and second valves 1B of each of the first coupler 2 and the second coupler 3 instantly perform a valve-closing action due to the extension urging of the urging bodies 18, and the valves are switched automatically into the closed-valve state.

Specifically, the first valve 1A and second valve 1B of the first coupler 2 and the second coupler 3 are each provided connected to an urging body 18 (in the present embodiment, an elastic body; e.g., a coil spring or a leaf spring, is used), and in the state in which the first coupler 2 and the second coupler 3 are separated, the first valves 1A and the second valves 1B move toward the coupler opening due to the extension urging of each of the urging bodies 18, and a state is entered in which the first valves 1A are in pressing contact with the coupler openings and block the coupler openings and the second valves 1B block the boundary sections between the first fluid passage sections 13 and the second fluid passage sections 14. The tips of the first valves 1A protrude from the coupler openings. By causing the first coupler 2 and the second coupler 3 to abut and connect, the tips of the first valves 1A protruding from each of the coupler openings press together in opposition to the extension urging of the urging bodies 18, the urging bodies 18 contract, the first valves 1A and second valves 1B move in the direction opposite to the side of the coupler openings, and the coupler openings and the boundary sections between the first fluid passage sections 13 and the second fluid passage sections 14 enter the open state. A state of communication is entered between the first fluid passage section 13, second fluid passage section 14, and piping-connection pipe section 15 of the first coupler 2, and the first fluid passage section 13, second fluid passage section 14, and piping-connection pipe section 15 of the second coupler 3.

Further, in the present embodiment, remaining-fluid-transferring mechanisms are provided independently in each of the first coupler 2 and the second coupler 3.

Specifically, a gas introduction section 7 and a fluid discharge section 16 are provided in the first fluid passage section 13 of each of the first coupler 2 and the second coupler 3, a fluid introduction section 17 is provided in the second fluid passage section 14 of the second coupler 3, and the fluid discharge sections 16 and the fluid introduction sections 17 are caused to assume a communicating state via the transfer piping sections 8. During emergency detachment, the first coupler 2 and the second coupler 3 separate, and after the first valves 1A and the second valves 1B are closed, helium gas is introduced from the gas introduction sections 7, remaining liquid hydrogen that remains within the first fluid passage sections 13 in the blocked state is drained via the fluid discharge sections 16, the remaining liquid hydrogen that has been discharged from the fluid discharge sections 16 is transferred via the transfer piping section 8 from the fluid discharge sections 17 into the second fluid passage sections 14 partitioned by the second valves 1B, and the interior of the first fluid passage sections 13 is replaced with helium gas.

The configuration is otherwise similar to that of Embodiment 1.

The action and effect of the present embodiment, configured as described above, are described below.

Figure 10:
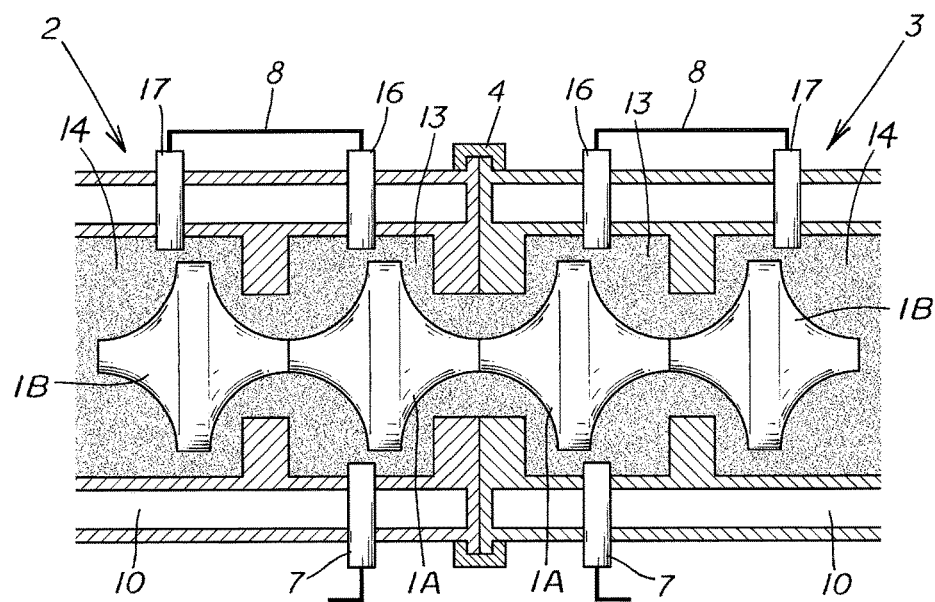
FIG. 10 illustrates the action during emergency detachment in Embodiment 2.

FIG. 10 illustrates the normal state during fluid handling. A state is assumed in which each of the urging bodies 18 contracts by the pressing-together of the first valves 1A, and the first valves 1A and second valves 1B of each of the first coupler 2 and the second coupler 3 are moved to the valve-open position, so that the first fluid passage section 13, second fluid passage section 14, and piping-connection pipe section 15 of the first coupler 2, and the first fluid passage section 13, second fluid passage section 14, and piping-connection pipe section 15 of the second coupler 3 are in a communicating state.

Figure 11:
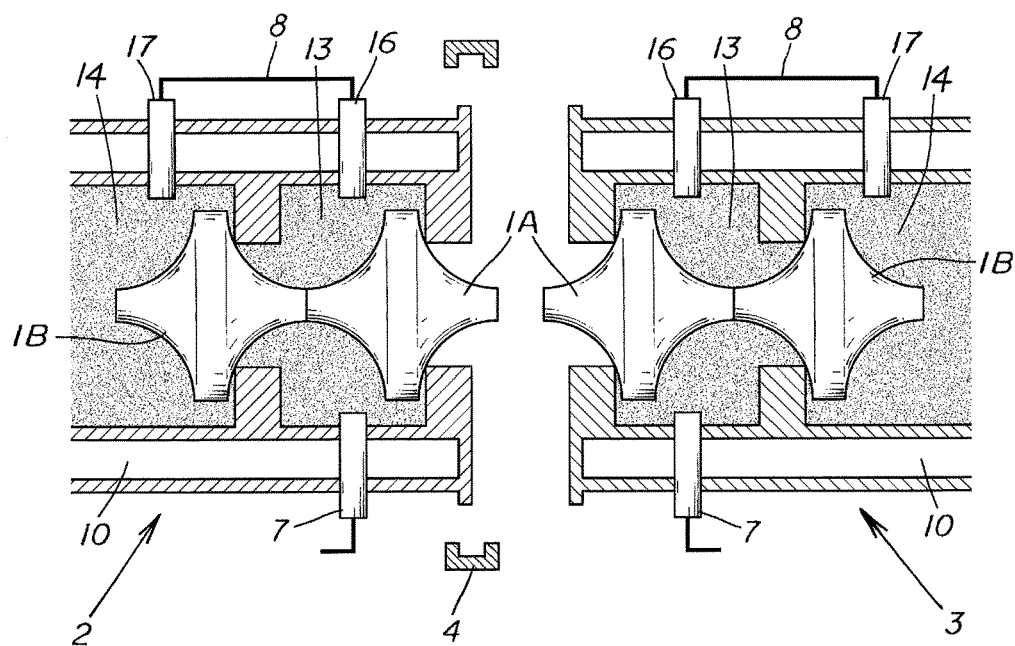
FIG. 11 illustrates the action during emergency detachment in Embodiment 2; and, FIG. 12 illustrates the action during emergency detachment in Embodiment 2.

During emergency detachment, starting from the state of FIG. 10 described above, first, the connection mechanism 4 is disengaged from the flange sections 12, the connection established between the first coupler 2 and the second coupler 3 is disestablished, and the first coupler 2 and the second coupler 3 are separated, as illustrated in FIG. 11. Due to the first coupler 2 and the second coupler 3 separating, the first valves 1A no longer press together, the first valves 1A and second valves 1B of each of the first coupler 2 and the second coupler 3 move to the closed-valve position due to the extension urging of each of the urging bodies 18, the first valves 1A block the coupler openings, and the second valves 1B block the boundary sections between the first fluid passage sections 13 and the second fluid passage sections 14 (put the first fluid passage sections 13 into the blocked state), and shut off the passage of liquid hydrogen that was being passed.

That is, in the present embodiment, both the action of separation of the first coupler 2 and the second coupler 3, and actions to shut off the passage of liquid hydrogen, are performed substantially simultaneously by the disestablishing operation of the connection mechanism 3.

Figure 12:
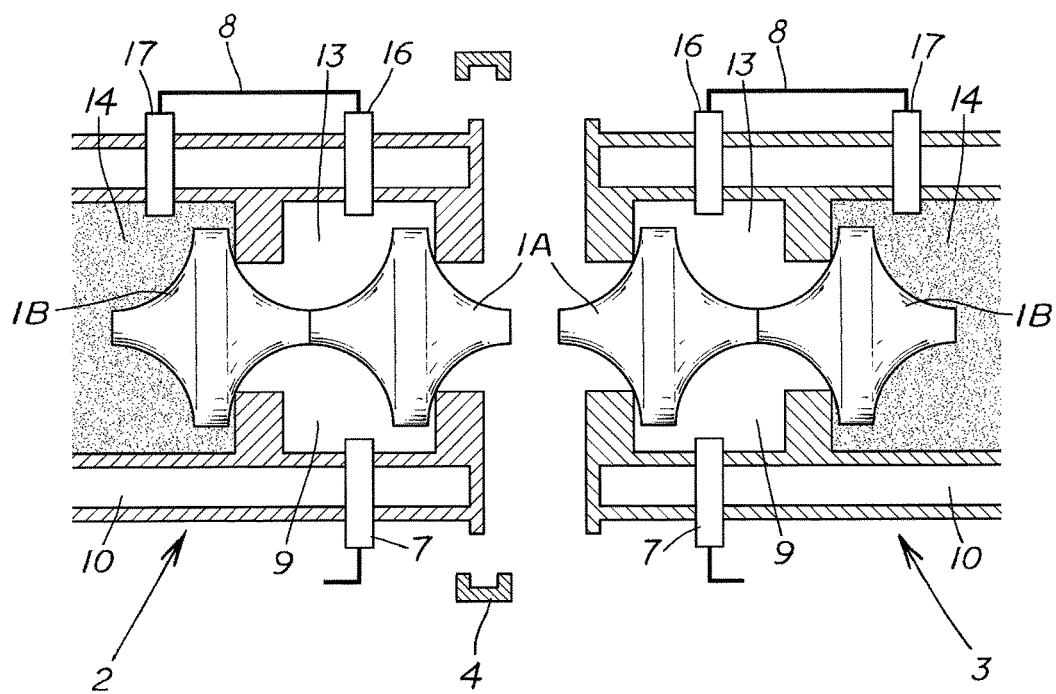

And, as illustrated in FIG. 12, in both the first coupler 2 and the second coupler 3, helium gas is introduced from the gas introduction section 7 into the first fluid passage section 13. Remaining liquid hydrogen that remains in the first fluid passage section 13, which is partitioned by the first valve 1A and second valve 1B and is in the blocked state, is discharged from the fluid discharge section 16 provided in the first fluid passage section 13, and introduced (transferred) to the inward side of the second valve 1B through the transfer piping section 8; i.e., from the fluid introduction section 17 provided in the second fluid passage section 14 into the second fluid passage section 14. The first fluid passage section 13 is replaced with helium gas, and the emergency detachment action is completed.

Once the emergency detachment action is in the completed state, similarly to Embodiment 1, in both the first coupler 2 and the second coupler 3, heat conduction between the inner pipe section 5 and the outer pipe section 6 is shut off by the vacuum section 10 provided between the inner pipe section 5 and the outer pipe section 6, and the first fluid passage section 13 into which helium gas has been sealed becomes a heat insulation section 9 having a heat insulation action. The heat conductivity between the first valves 1A and the second valves 1B is reduced by the heat insulation sections 9, the heat insulation performance between the first valves 1A and the second valves 1B improves, and an effect similar to that of Embodiment 1 is exhibited.

Further, in the present embodiment, with the first coupler 2 and the second coupler 3 in a connected state, the pressing-together of the first valves 1A causes the urging bodies 18 to contract in opposition to extension urging, whereby each of the first valves 1A and the second valves 1B enter the open-valve state. During emergency detachment, when the connection established by the connection mechanism 4 is disestablished and a state is entered in which separation is possible, there is no longer a force pressing together the first valves 1A, and the extension urging of the urging bodies 18 instantly causes the first valves 1A and second valves 1B of the first coupler 2 and the second coupler 3 to perform a closing action, and switch automatically to the closed-valve state. What is therefore obtained is a high-practicality emergency detachment device of a fluid handling device that can easily be designed and realized without requiring complicated action mechanisms and driving sections for causing the first valves 1A and the second valves 1B to perform opening and closing actions.

The present invention is not limited to Embodiments 1 and 2, and the specific required constituent elements can be designed appropriately.

The invention claimed is:

1. An emergency detachment device of a fluid handling device, the emergency detachment device being configured so that two of a first valve and a second valve are provided to a first coupler and second coupler, respectively, for shutting off the passage of fluid that is being passed within handling piping and preventing the fluid from flowing out to the exterior, said first coupler and said second coupler are detachably connected by a connection mechanism to allow emergency detachment to be performed, and the emergency detachment device being configured so that, in an emergency, the valves of each of the first coupler and the second coupler operate to enter a closed-valve state and shut off passage of the fluid, the connection mechanism disestablishes the connection between the first coupler and the second coupler, and the first coupler and the second coupler separate, wherein the emergency detachment device of a fluid handling device has a construction in which: each of the first coupler and the second coupler is formed in a vacuum dual-layer structure, in which an inner pipe section through which the fluid passes is covered by an outer pipe section, and in which a space between the inner pipe section and the outer pipe section is placed in a vacuum state, and said first and second valves are provided in series within the inner pipe section in the direction in which the fluid passes; the emergency detachment device of a fluid handling device is provided with a remaining-fluid-transferring mechanism for causing residual fluid that remains on the coupler-opening side of second valves to be transferred into the inner pipe sections, which are further inward than the second valves, after the second valves have both assumed the closed-valve state during emergency detachment, said second valves within the inner pipe section, provided further inward than said first valves, which are provided on the coupler-opening sides; the remaining-fluid-transferring mechanism is configured so that a gas for fluid transfer is introduced into a residual fluid section, in which the residual fluid remains, via a section for introduction of gas for fluid transfer provided in the inner pipe section on the coupler-opening side of the second valve, the residual fluid is discharged from the residual fluid section, and the residual fluid is transferred via a transfer piping section into the inner pipe section provided further inward than the second valve of one or both of the first coupler and the second coupler; and in an emergency detachment action completion state in which the first valves and the second valves are in the closed-valve state and the first coupler and the second coupler are separated, the space sections partitioned and formed by each of the first valves and the second valves in the closed-valve state in the first coupler and the second coupler become heat insulation sections, heat conduction to the inner pipe sections and the second valves is reduced to an extent possible by the heat insulation sections and vacuum sections between the inner pipe sections and the outer pipe sections, evaporation of fluid within the inner pipe sections is prevented, the conduction of coldness of the fluid to the outer pipe sections and the first valves is reduced to an extent possible, and the coupler surfaces are prevented from reaching extremely low temperatures.

2. The emergency detachment device of a fluid handling device according to claim 1, wherein the fluid is liquid hydrogen, and the gas for fluid transfer is helium gas.

3. The emergency detachment device of a fluid handling device according to claim 1, wherein: during emergency detachment, the second valves of each of the first coupler and the second coupler enter the closed-valve state, and residual fluid that remains in the space between the second valve of the first coupler and the second valve of the second coupler, which are in the closed-valve state, is transferred by the remaining-fluid-transferring mechanism to the inner pipe section provided further inward than the second valve of one or both of the first coupler and the second coupler; the space between the second valve of the first coupler and the second valve of the second coupler is replaced with the gas for fluid transfer, whereupon the first valves, of each of the first coupler and the second coupler are caused to assume the closed-valve state and the heat insulation sections are formed in the space between the first valves and the second valves; and after the heat insulation sections have been formed, the connection established by the connection mechanism is disestablished, the first coupler and the second coupler are separated, and emergency detachment is performed.

4. The emergency detachment device of a fluid handling device according to claim 1, wherein: during emergency detachment, the connection established by the connection mechanism is disestablished and the first coupler and the second coupler are separated, and the first valves and the second valves of both the first coupler and the second coupler enter the closed-valve state through the separating of the first coupler and the second coupler; residual fluid that remains in the space between the first valves and the second valves that are in the closed-valve state in each of the first coupler and the second coupler is transferred into the inner pipe sections provided inward of the second valves by the remaining-fluid-transferring mechanism; and the space between the first valves and the second valves in each of the first coupler and the second coupler is replaced with the gas for fluid transfer, the heat insulation sections being formed between the first valves and the second valves.

5. The emergency detachment device of a fluid handling device according to claim 2, wherein: during emergency detachment, the second valves of each of the first coupler and the second coupler enter the closed-valve state, and residual fluid that remains in the space between the second valve of the first coupler and the second valve of the second coupler, which are in the closed-valve state, is transferred by the remaining-fluid-transferring mechanism to the inner pipe section provided further inward than the second valve of one or both of the first coupler and the second coupler; the space between the second valve of the first coupler and the second valve of the second coupler is replaced with the gas for fluid transfer, whereupon the first valves, of each of the first coupler and the second coupler are caused to assume the closed-valve state and the heat insulation sections are formed in the space between the first valves and the second valves; and after the heat insulation sections have been formed, the connection established by the connection mechanism is disestablished, the first coupler and the second coupler are separated, and emergency detachment is performed.

6. The emergency detachment device of a fluid handling device according to claim 2, wherein: during emergency detachment, the connection established by the connection mechanism is disestablished and the first coupler and the second coupler are separated, and the first valves and the second valves of both the first coupler and the second coupler enter the closed-valve state through the separating of the first coupler and the second coupler; residual fluid that remains in the space between the first valves and the second valves that are in the closed-valve state in each of the first coupler and the second coupler is transferred into the inner pipe sections provided inward of the second valves by the remaining-fluid-transferring mechanism; and the space between the first valves and the second valves in each of the first coupler and the second coupler is replaced with the gas for fluid transfer, the heat insulation sections being formed between the first valves and the second valves.

* * * * *